Sept. 5, 1933.  E. H. FUNDOM  1,925,728

CLUTCH MECHANISM

Filed April 10, 1931  3 Sheets-Sheet 1

INVENTOR.
Earl H. Fundom.

BY
Edwin P. Corbett
ATTORNEY.

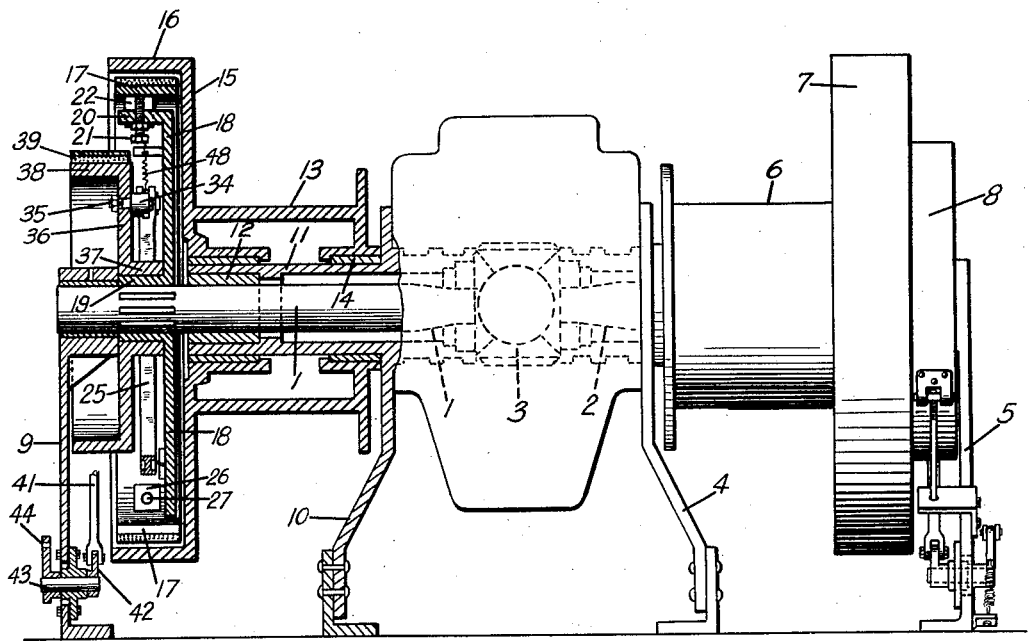

Sept. 5, 1933.  E. H. FUNDOM  1,925,728
CLUTCH MECHANISM
Filed April 10, 1931   3 Sheets-Sheet 3

INVENTOR.
Earl H. Fundom.
BY
ATTORNEYS.

Patented Sept. 5, 1933

1,925,728

UNITED STATES PATENT OFFICE 1,925,728

CLUTCH MECHANISM

Earl H. Fundom, Kenton, Ohio, assignor, by mesne assignments, to The Marion Steam Shovel Company, Marion, Ohio, a corporation of Ohio Application April 10, 1931. Serial No. 529,077

7 Claims. (Cl. 192—36)

My invention relates to clutch mechanism. It has to do more particularly with a clutch mechanism for use upon excavators, although it is not necessarily limited thereto.

One of the objects of my invention is to provide a clutch mechanism which is extremely simple and sensitive in operation.

Another object of my invention is to provide a clutch mechanism that may be easily assembled upon and driven from the driving axle of the tractor unit or that may be independently mounted upon a shaft and actuated to clutch an element to be driven to such shaft, motor force being furnished by some such motor as an electric motor or a gasoline motor.

Another object of my invention is to provide a positively operable clutch mechanism which, though positive in operation, may be released instantaneously and without difficulty.

My invention preferably contemplates the use of clutching bands and expansion shoes and the actuation thereof by leverage mechanism involving toggle levers. The preferred mechanism embodies a driven element at times freely rotatable with relation to the shaft upon which it is mounted. This driven element preferably comprises an annular driven unit of the clutch within which is mounted an expansible shoe. The expansible shoe is adapted to be expanded by a toggle lever mechanism which is rendered effective to expand the expansible shoe by the application of a brake band to a drum so as to retard the movement of this drum and thereby actuate the toggle lever mechanism described. Furthermore, the expansible shoe is expanded in such a manner as to cause friction to be evenly distributed around the entire inner surface of the drum.

The preferred embodiment of my invention is shown in the accompanying drawings wherein similar characters of reference designate corresponding parts and wherein:

Figure 4 is a side elevation, partly in section, showing the rear end of a tractor unit with my clutch mechanism disposed in cooperation with the winding drum.

Figure 5 is a side elevation, partly broken away, looking from the left of the clutch mechanism shown in Figure 4 and illustrating the clutch mechanism in inoperative position.

Figure 6 is a side elevation of the structure shown in Figure 5 and illustrating the clutch in operative position.

Figure 1:
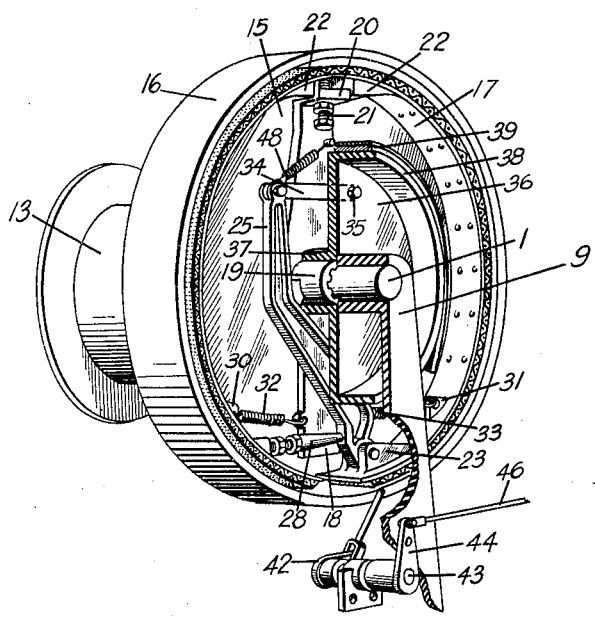
Figure 1 is a perspective view, partially in section, of my clutch mechanism.
Figure 2:
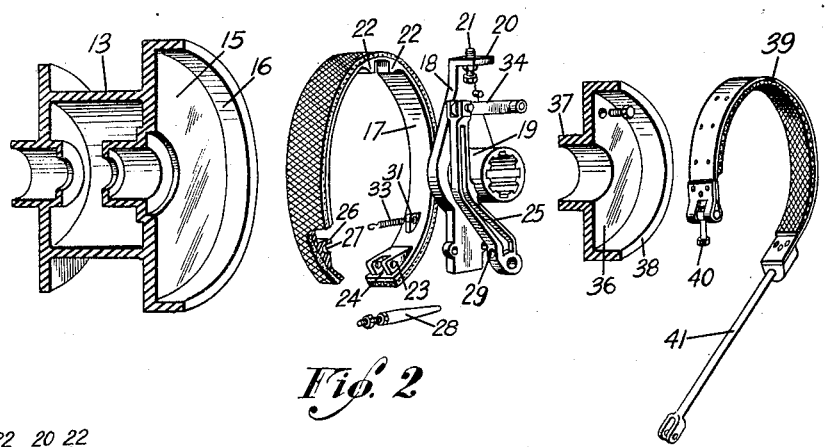
Figure 2 is a perspective view of all the parts which make up my clutch mechanism in disassembled relation.

In the drawings, with particular reference to Figures 1 to 3 and 4 to 6, inclusive, I have shown my preferred form of clutch mechanism mounted upon the axle structure of an excavator. This axle structure comprises axle members 1 and 2 which are connected together by the differential that may be designated 3. The axle member 2 is shown supported by uprights 4 and 5. It carries a winding drum 6 with a comparatively large rigid housing 7 of annular form rigidly mounted thereon. Arranged for cooperation with this housing, is a clutching mechanism which may be generally designated 8 and which is identical with the clutching mechanism which is carried upon the axle member 1 and which will now be described in detail.

As shown at the left of Figure 4, the axle member 1 is carried by uprights 9 and 10, the upright 10 being provided with an integrally formed sleeve 11. This sleeve 11 extends to either side of the upright 10 and, at the left of the upright, is supported from the axle member 1 by means of a bronze bushing 12. Carried upon the exterior of this portion of the sleeve 11 is a winding drum 13 supported from the sleeve by bronze bushings 14.

The winding drum 13 is mounted for free rotation upon the sleeve 11. However, it is provided with an integrally formed housing 15 having an annular flange 16 thereon. This housing is designed to constitute the driven member of a friction clutch structure which is operative to connect the winding drum to the axle member 1 so that it may rotate therewith.

Within this housing 15 and disposed in cooperative relation to the interior of the annular flange 16 is an expansible shoe 17. This expansible shoe 17 is carried from the axle member 1 by means of an arm 18 having a hub 19 which is keyed to the axle member 1. The arm 18 is provided at its upper end with a laterally extended flange 20 within which is mounted an adjusting screw 21.

The laterally extending flange 20 is disposed between spaced lugs 22 which are integrally formed upon the interior of the shoe 17 so as to ensure that this shoe 17 will rotate with the axle member 1. The adjusting screw 21 permits of adjusting the shoe 17 towards or from the interior surface of the annular flange 16 to compensate for wear. The exterior of the shoe 17 may be covered with any suitable type of brake lining.

Adjacent its free ends, the expanding shoe 17 is provided upon its inner surfaces with means facilitating the association therewith of a toggle lever construction. Thus one end of the shoe is provided upon its inner surface with a shoulder or lug 23 which is bifurcated as at 24 for the pivotal retention of a lever 25. The other end of the expansible shoe is provided with a shoulder or lug 26 having a socket 27 therein for the reception of one end of a thrust member 28, whose other end is designed to have a thrust bearing in a socket 29 formed in one side of the lever 25. The thrust member 28 is adjustable as to length. It will be seen from the drawings that force is applied from the lever 25 to the outer end of the toggle link 28 at the socket 29. Thus, this lever 25 is provided with a long lever arm extending from socket 29 to the upper end thereof, and a short lever arm extending from the socket 29 to the fulcrum point 23. Furthermore, the said short arm of this lever forms the other link of the toggle mechanism, as will be readily apparent.

The free ends of the expansible shoe 17 are further provided upon their inner surfaces with lugs 30 and 31. The lug 30 has an aperture therein for the connection of a tension spring 32 whose opposite end is connected to an aperture in the arm 18, as shown best in Figures 1 and 5. The lug 31 is likewise apertured so that there may be connected thereto a tension spring 33 whose opposite end is likewise adapted to be connected to the arm 18. These tension springs serve to normally retract the free ends of the shoe 17 and maintain them out of contact with the inner periphery of the annular flange 16.

The lever 25 is bent so that it will pass upwardly around the axle member 1 and, at its upper end, has pivoted thereto a link 34. The opposite end of this link 34 is pivoted as at 35 to a drum 36. This drum 36 is provided with a hub portion 37 which is oscillatably mounted upon the hub 19 of the arm 18.

The drum 36 is further provided with an annular flange 38. This annular flange 38 is adapted to be embraced by a brake band 39. One end of the brake band 39 is anchored to the upright 9 as at 40. The opposite end of this brake band 39 is connected to a link 41 whose opposite end is connected to a crank arm 42 upon a stub shaft 43. The opposite end of the stub shaft 43 carries a crank arm 44 to which is connected a tension spring 45 for normally tending to rotate or oscillate the shaft 43 to such a position that the brake band 39 will be maintained out of frictional relation with the annular flange 38 of the drum 36. The crank arm 44 has its extremity pivotally connected to a pull rod 46 whose opposite end is pivoted to a hand lever 47.

The upper end of the lever 25 has connected thereto a spring 48 whose opposite end is connected to the arm 18. Furthermore, the arm 25 is provided, within the elbow thereof, with a lug 49 which limits the approach of this arm 25 to the axle member 1 by contact with the hub 37 of the drum 36.

In the operation of this structure shown in Figures 1 to 6, the clutch mechanism just described is normally disengaged so that the winding drum 13 does not rotate with the axle member 1. In order to bring about a clutching of this winding drum 13 to the axle member 1, the hand lever 47 is actuated to tighten the brake band 39 upon the annular flange 38 of the drum 36. This retards rotation of this drum 36 so that the link 34 exerts a thrusting force upon the free end of the lever arm 25, which results in movement of this arm 25 away from the axle member 1. As a result of this movement, the toggle lever mechanism made up of the lower end of the lever arm 25 and the thrust member 28 exerts an expanding pressure upon the free ends of the expanding shoe 17. The expansion of this shoe 17 causes it to frictionally engage with the inner periphery of the annular flange 16 of the housing member 15 so that the winding drum 13 is clutched to the arm 18 which is rotating with the axle member 1. The clutching action is instantaneous and amply effective to ensure rotation of the winding drum 13 with the axle member 1. Furthermore, the clutching action is such that it may be brought about by extremely light pressure upon the hand lever 47 and, also, the clutching action is such that instantaneous release may be obtained by merely releasing the control lever.

Figure 7:
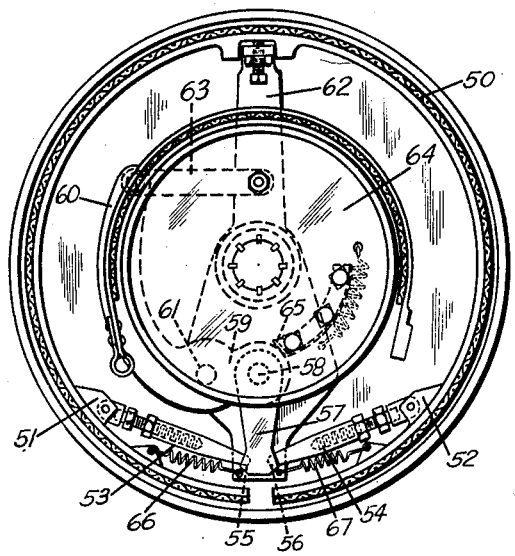
Figure 7 is a side elevation of a modified form of clutch mechanism, with the parts shown in inoperative position.
Figure 8:
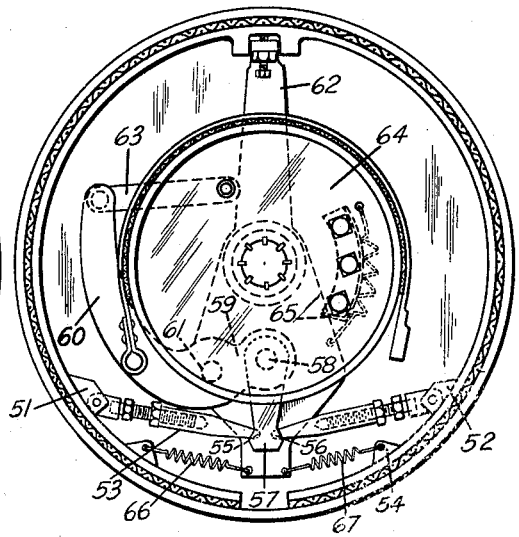
Figure 8 is a side elevation of the structure shown in Figure 7, showing the position of the parts of the clutch when it is operated.

In the form shown in Figures 7 and 8, the mechanism utilized is substantially identical with the mechanism just described, with several exceptions. One exception consists in the fact that the expanding shoe which may be designated 50 is provided upon the inner surface of its free ends with lugs 51 and 52 to which are pivotally connected thrust members 53 and 54 which are adjustable as to length. These thrust members 53 and 54 are preferably tapered at their outer extremities and fit in sockets 55 and 56 in the sides of a link 57.

The link 57 is pivotally hung as at 58 from the short arm 59 of a lever 60 which is pivotally mounted as at 61 upon an arm 62 which corresponds to the arm 18 of the form shown in Figures 1 to 6. The upper end of the lever arm 60 has a thrust link 63 pivotally connected thereto and the opposite end of this link is pivoted to the rear face of a drum 64 which corresponds to the drum 36 of Figures 1 to 6.

Figure 3:
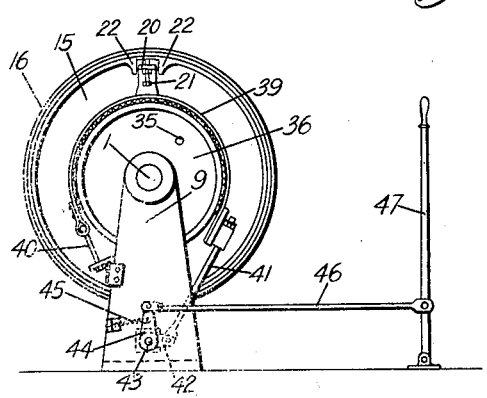
Figure 3 is a side view of the leverage mechanism which I preferably use for rendering my clutch mechanism operative.

In the operation of this form shown in Figures 7 and 8, the drum 64 is retarded by the application of a brake band through the medium of a hand controlled lever of the type illustrated in Figure 3. The retardation of this drum throws the free end of the lever arm 60 outwardly away from the axle member 1, this movement being limited by the contact of the stop member 65 with the short arm 59 of the lever 60. This movement of the free end of the lever arm 60 causes the short arm 59 to lift the member 57 which exerts a thrusting force upon the thrust members 53 and 54 and serves to expand the free ends of the expansion shoe 50 against the tension of the springs 66 and 67. This clutches the expansible shoe 50 to the housing of the winding drum and causes this winding drum to rotate with the arm 62 which is rotating with the axle member 1.

Figure 9:
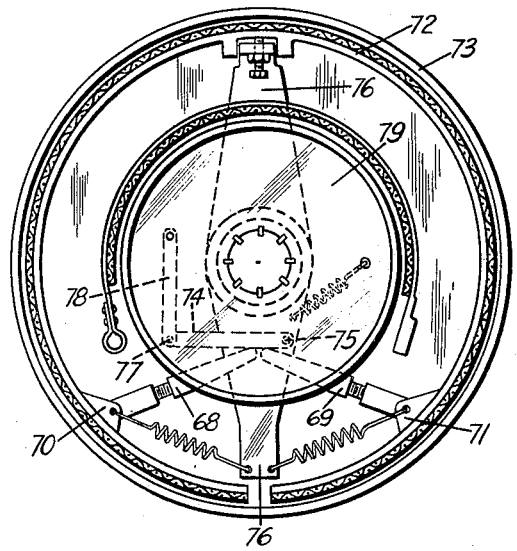
Figure 9 is a side elevation of a still further modified form of my clutch mechanism with the parts shown in inoperative position.
Figure 10:
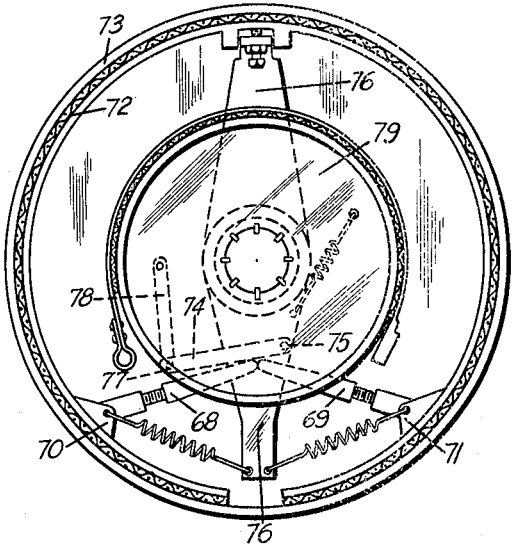
Figure 10 is a side elevation of the structure shown in Figure 9 with the parts shown in operative position.

In the structure shown in Figures 9 and 10, the thrust members 68 and 69 are pivoted to lugs 70 and 71 which are carried upon the inner faces of the free ends of an expansible shoe 72 mounted within the annular flange 73 of a housing carried upon a winding drum. These thrust members 68 and 69 are preferably adjustable as to length and have their outer extremities disposed in abutting relation to form a toggle mechanism which is operable by pressure applied in a direction away from the axle member 1.

The pressure for operating this toggle lever mechansim to effect expansion of the shoe 72 is directly applied to the abutting ends of the thrust members 68 and 69 by means of an arm 74 which is pivotally mounted as at 75 upon an arm 76 which corresponds to the arm 18 of Figures 1 to 6. The outer end of the pivoted arm 74 is in turn pivotally connected as at 77 to a thrust link 78 whose opposite end is pivoted to a brake drum 79 which corresponds to the brake drum 36 of Figure 1. It will be understood that the application of a retarding pressure to the brake drum 79 by means of a brake band will cause the thrust link 78 to press the arm 74 downwardly as shown in Figure 10. This actuates the toggle lever mechanism to expand the ring 72 and effect the clutching operation in a manner that will be understood.

It will be seen from this description that I have provided an extremely simple clutch mechanism which is effective with a minimum pressure to bring about an adequate clutching action for all conditions to which it is intended to be applied. It will likewise be apparent that the clutching mechanism is of such a nature that instantaneous release may also be effected by merely releasing the operating lever.

Having thus described my invention, what I claim is:

1. A clutch structure comprising a driven element having a friction surface, a driving element movable into and out of driving relation to said friction surface by expansive and contractive action, a supplementary brake structure, and means for controlling the expansive action of said driving element in response to actuation of said supplementary brake structure, said means comprising a toggle structure wherein one of the toggle links is the short arm of a lever while the other toggle link is a thrust member receiving its application of force from said lever intermediate the fulcrum of said lever and the point of application of power to said lever, and means for driving said driving element by an arm contacting with said driving element substantially at a central point between the ends thereof.

2. A clutch structure comprising a driven element having a friction surface, a driving element movable into and out of driving relation to said friction surface by expansive and contractive action, a supplementary brake structure, and means for controlling the expansive action of said driving element in response to actuation of said supplementary brake structure, said means comprising a toggle structure wherein one of the toggle links is the short arm of a lever which is pivotally connected to one end of said driving element, while the other toggle link is a thrust member having one end fitting in a socket formed in said lever, the other end of said thrust member fitting in a socket in one end of said driving member, said thrust member receiving its application of force from said lever intermediate the fulcrum of said lever and the point of application of power to said lever, and means for driving said driving element by an arm contacting with said driving element substantially at a central point between the ends thereof.

3. A clutch structure comprising a driven element having a friction surface, a driving element movable into and out of driving relation to said friction surface by expansive and contractive action, a supplementary brake structure, and means for controlling the expansive action of said driving element in response to actuation of said supplementary brake structure, said means comprising a toggle structure wherein the toggle members are disconnected from each other, and means for forcing the outer ends of said toggle members apart, said means comprising a lever which applies force to said toggle members by contact intermediate the fulcrum of said lever and the point of application of force thereto.

4. A clutch structure comprising a driven element having a friction surface, a driving element movable into and out of driving relation to said friction surface by expansive and contractive action, a supplementary brake structure, and means for controlling the expansive action of said driving element in response to actuation of said supplementary brake structure, said means comprising a toggle structure wherein the toggle links are provided with rounded ends, and means for exerting a thrust pressure on said rounded ends to force said toggle members towards straight-line position.

5. A clutch structure comprising a driven element having a friction surface, a driving element movable into and out of driving relation to said friction surface by expansive and contractive action, a supplementary brake structure, and means for controlling the expansive action of said driving element in response to actuation of said supplementary brake structure, said means comprising a toggle structure wherein the toggle links are provided with rounded ends, means for exerting a thrust pressure on said rounded ends to force said toggle members towards straight-line position, means for driving said driving element by an arm contacting with said driving element substantially at a central point between the ends thereof, and adjustable means on said arm for compensating for wear of said driving element.

6. In a clutch mechanism, a rotatable support, a driven element mounted for rotation with relation to said support and having an internal fractional surface, a split annular friction member arranged to cooperate with said friction surface, a frame connected with said rotatable support for rotation therewith and connected with said friction member at a point substantially midway between the ends of said friction member, yieldable means connected to said friction member near the respective ends thereof and to said frame, said yieldable means being adapted to normally maintain said friction member out of engagement with said friction surface, a lever connected with said friction member near one end thereof, a thrust rod connected at one end with said friction member near the other end of said friction member, said thrust rod being connected at its other end with said lever, and a manually controlled retarding device connected with said lever.

7. In a clutch mechanism, a rotatable support, a driven element mounted for rotation with relation to said support and having an internal frictional surface, a split annular friction member arranged to cooperate with said friction surface, a frame connected with said rotatable support for rotation therewith and connected with said friction member at a point substantially midway between the ends of said friction member, yieldable means connected to said friction member near the respective ends thereof and acting on said friction member to normally maintain the same out of engagement with said friction surface, a lever, means including a thrust rod to connect said lever with said friction member near the respective ends thereof, a brake member normally rotatable with said support, means to retard the rotation of said brake member, and means for connecting said lever with said brake member to cause the retardation of said brake member to actuate said lever and expand said friction member.

EARL H. FUNDOM.